(12) United States Patent
Saito

(10) Patent No.: US 12,745,002 B2
(45) Date of Patent: Sep. 22, 2026

(54) APPARATUS, CAPTURING APPARATUS, METHOD FOR APPARATUS

(71) Applicant: CANON KABUSHIKI KAISHA, Tokyo (JP)

(72) Inventor: Mitsuhiro Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 269 days.

(21) Appl. No.: 18/596,083

(22) Filed: Mar. 5, 2024

(65) Prior Publication Data

US 2024/0314431 A1 Sep. 19, 2024

(30) Foreign Application Priority Data

Mar. 15, 2023 (JP) ................................. 2023-040821

(51) Int. Cl.
*H04N 23/68* (2023.01)

(52) U.S. Cl.
CPC ......... *H04N 23/683* (2023.01); *H04N 23/681* (2023.01)

(58) Field of Classification Search
CPC ........................... H04N 23/683; H04N 23/687
See application file for complete search history.

(56) References Cited

U.S. PATENT DOCUMENTS 7,385,632 B2 * 6/2008 Shinohara .......... H04N 23/6811 348/208.5
12,301,998 B2 * 5/2025 Shimada .............. H04N 23/687
2008/0204564 A1 * 8/2008 Yumiki .................. H04N 23/76 348/E5.037
2018/0367734 A1 * 12/2018 Thumpudi ............. H04N 23/70
2019/0268545 A1 * 8/2019 Inomata ............... H04N 23/959
2023/0292007 A1 * 9/2023 Ito ...................... H04N 23/6812
2024/0013441 A1 * 1/2024 Le ............................ G06T 3/40

FOREIGN PATENT DOCUMENTS

JP 2018180341 A 11/2018

* cited by examiner

*Primary Examiner* — Cynthia Calderon
(74) *Attorney, Agent, or Firm* — Canon U.S.A., Inc. IP Division

(57) ABSTRACT

An apparatus includes a detection unit that detects an object from an image, a first obtaining unit that obtains motion information indicating a motion of the object, a second obtaining unit that obtains motion information indicating a motion of a capturing apparatus, a control unit that controls first stabilization to correct the motion of the object and second stabilization to correct an image blur caused by the motion of the capturing apparatus, and a determination unit that performs a determination of which one of the first stabilization and the second stabilization has a higher priority based on the motion information about the object, wherein the control unit controls the first stabilization and the second stabilization based on a result of the determination.

19 Claims, 5 Drawing Sheets

Figure 1:
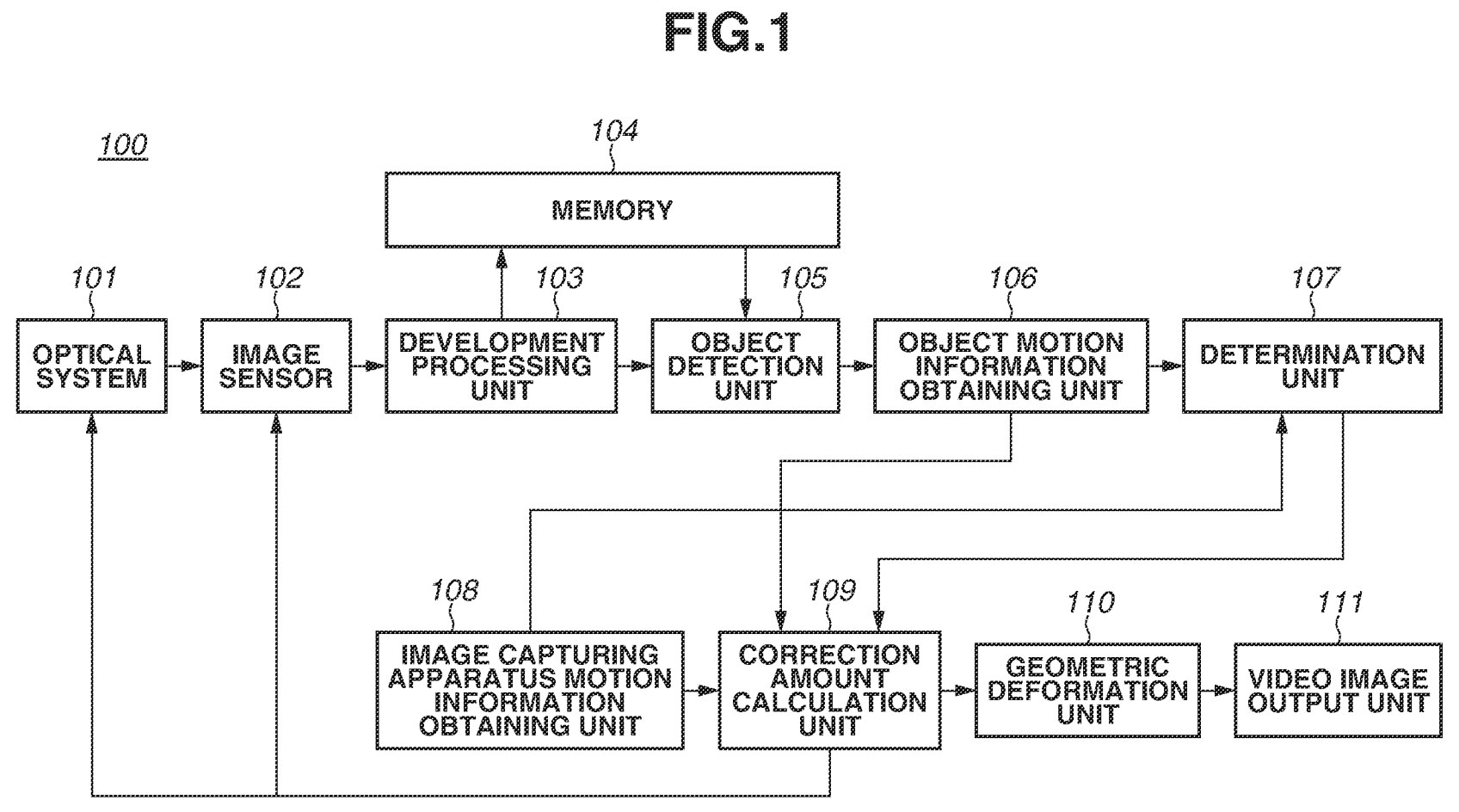

101 OPTICAL SYSTEM

102 IMAGE SENSOR

103 DEVELOPMENT PROCESSING UNIT

104 MEMORY

105 OBJECT DETECTION UNIT

106 OBJECT MOTION INFORMATION OBTAINING UNIT

107 DETERMINATION UNIT

108 IMAGE CAPTURING APPARATUS MOTION INFORMATION OBTAINING UNIT

109 CORRECTION AMOUNT CALCULATION UNIT

110 GEOMETRIC DEFORMATION UNIT

111 VIDEO IMAGE OUTPUT UNIT

POSITION
401
404
405
th
th'
406
TIME
402
403

POSITION
408
407
TIME

POSITION
th3
th2
th1
409
th1'
th2'
th3'
TIME

APPARATUS, CAPTURING APPARATUS, METHOD FOR APPARATUS

BACKGROUND

Technical Field

The aspect of the embodiments relates to a technique for stabilizing an object image using an image stabilization unit.

Description of the Related Art

Various image stabilization functions for correcting an image blur caused by a camera shake or the like applied to an image capturing apparatus, such as a digital camera, have recently been proposed. These image stabilization functions, when incorporated in image capturing apparatuses, make it possible to capture more excellent images. In addition, a technique for correcting an object blur (also referred to as "tracking") caused due to a change in the position of an object, such as a person, separately from a camera shake caused due to a motion of a user holding a main body of an image capturing apparatus has also been proposed. A camera shake caused due to a motion of the user can be detected based on a detection result from an angular velocity sensor attached to the image capturing apparatus, or an amount of movement of a still region within a captured image. On the other hand, an object blur can be detected by an object recognition unit or the like based on an amount of movement of the position of an object. Such an object blur can be corrected by controlling an image stabilization unit based on the detected motion of the object in such a manner that the object is set at a specific position, such as the center of an image.

An image capturing apparatus discussed in Japanese Patent Application Laid-Open No. 2018-180341 performs object tracking and image stabilization to correct an image blur caused by a shake of the image capturing apparatus by driving an image capturing unit in pan and tilt directions. This image capturing apparatus calculates a first driving amount for preventing an image blur due to a shake applied to the image capturing apparatus and a second driving amount for object tracking, and generates a driving signal based on a predetermined ratio of the first driving amount and the second driving amount. When a pan driving speed and a tilt driving speed are more than or equal to a threshold, the predetermined ratio is set to be smaller than that when the pan driving speed and the tilt driving speed are less than the threshold, thereby providing a configuration in which an oscillation phenomenon is less likely to occur.

However, the technique discussed in Japanese Patent Application Laid-Open No. 2018-180341 does not provide a detailed description of which one of correction of an object blur and correction of a shake applied to the image capturing apparatus has a higher priority, and fails to carefully study how to switch between correction of an object blur and correction of a shake applied to the image capturing apparatus.

SUMMARY

According to an aspect of the embodiments, an apparatus includes a detection unit configured to detect an object from an image, a first obtaining unit configured to obtain motion information indicating a motion of the object detected in the image, a second obtaining unit configured to obtain motion information indicating a motion of a capturing apparatus, a control unit configured to control first stabilization to correct the motion of the object in the image and second stabilization to correct an image blur caused by the motion of the capturing apparatus, and a determination unit configured to perform a determination of which one of the first stabilization and the second stabilization has a higher priority based on the motion information about the object, wherein the control unit controls the first stabilization and the second stabilization based on a result of the determination.

Further features of the disclosure will become apparent from the following description of exemplary embodiments with reference to the attached drawings.

BRIEF DESCRIPTION OF THE DRAWINGS

FIG. 1 is a block diagram illustrating a configuration example of an image capturing apparatus according to an exemplary embodiment.

DESCRIPTION OF THE EMBODIMENTS

Figure 2:
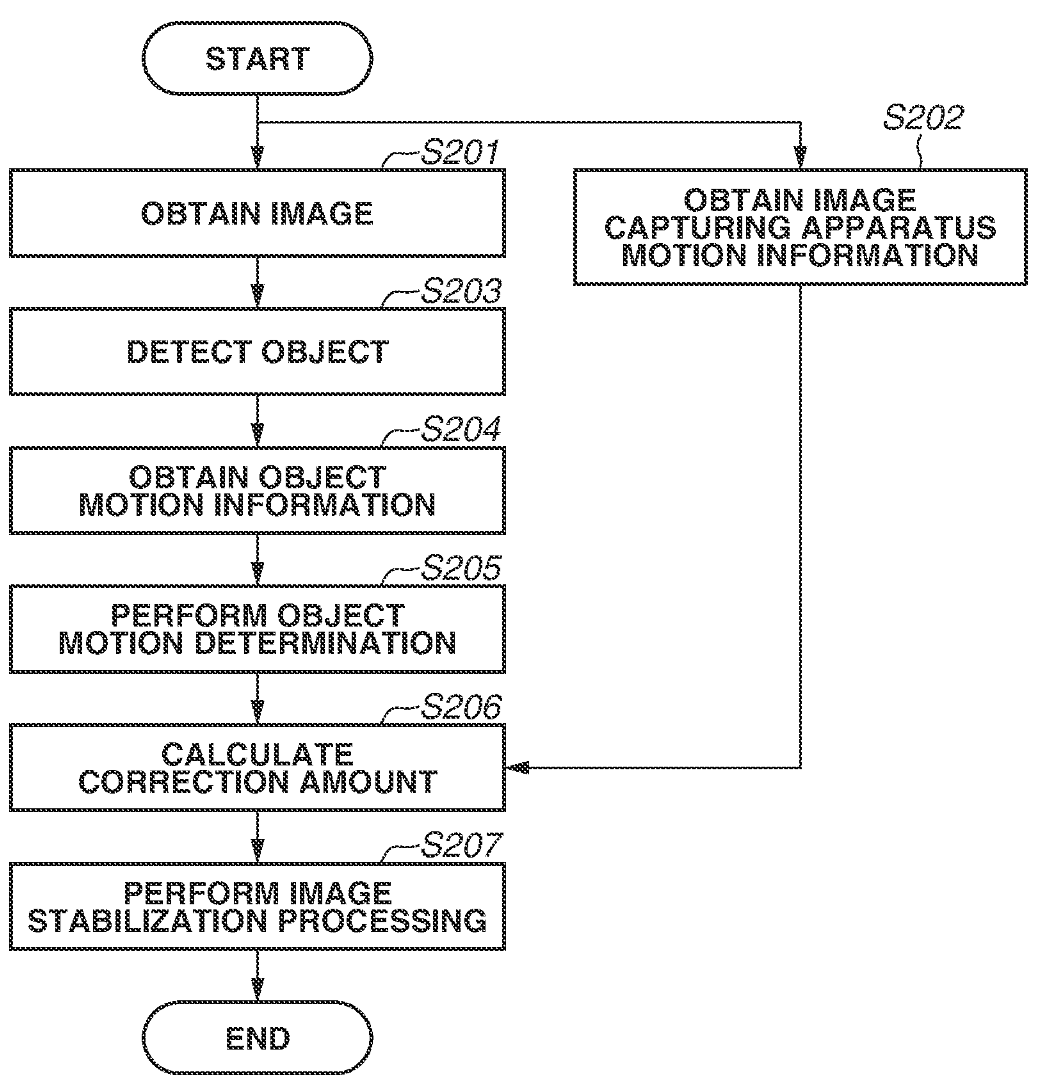
FIG. 2 is a flowchart illustrating an object tracking operation according to the exemplary embodiment.

Exemplary embodiments of the disclosure will be described below with reference to the accompanying drawings. The following exemplary embodiments are not intended to limit the disclosure. Multiple features are described in the exemplary embodiments, but not all of these features are essential to the disclosure and these features can be arbitrarily combined. In the accompanying drawings, the same reference numerals are given to the same or similar components, and redundant description thereof is omitted.

As an image stabilization apparatus according to an exemplary embodiment of the disclosure, an example of an image capturing apparatus including three image stabilization units, i.e., a lens-type image stabilization unit, a sensor-type image stabilization unit, and an electronic image stabilization unit will be described. The lens-type image stabilization unit is a function for correcting an image blur by driving (displacing) a correction lens. The sensor-type image stabilization unit is a function for correcting an image blur by driving (displacing) an image sensor 102. The electronic image stabilization unit is a function for correcting an image blur by performing image processing such as geometric deformation on an obtained image signal.

The image capturing apparatus according to the present exemplary embodiment includes an object image stabilization function (also referred to as "object tracking") for correcting a type of image blur, that is, a blur of a main object image (hereinafter referred to as "object blur") due to a motion of the main object in an image. If it is determined that the motion of the object in the image is large during object tracking and it is difficult to continue the object tracking, a shake applied to the image capturing apparatus is corrected with a higher priority than an object blur. The determination as to whether it is difficult to continue object tracking is made based on motion information about the object in the image.

In the present specification, a shake applied to the image capturing apparatus may be referred to as a camera shake.

Examples of this shake include not only a camera shake caused by a motion of a user's hand, but also a shake caused by a motion transmitted from a vehicle or a building when the image capturing apparatus is fixed in the vehicle or the building. Exemplary embodiments of the disclosure will be described below.

FIG. 1 is a block diagram illustrating a configuration example of an image capturing apparatus 100 that is an example of the image stabilization apparatus according to the disclosure. The image capturing apparatus 100 includes an optical system 101 that forms an object image, the image sensor 102, such as a charge-coupled device (CCD) sensor or a complementary metal-oxide semiconductor (CMOS) sensor, that photoelectrically converts the object image formed by the optical system 101, and a development processing unit 103 that forms an image signal from an electric signal output from the image sensor 102.

The optical system 101 includes a lens unit. The lens unit includes a correction lens that is driven in a direction different from an optical axis of the optical system 101, to thereby correct the object image on an imaging plane. This correction lens is driven based on a correction amount calculated by a correction amount calculation unit 109 to be described below, thereby making it possible to correct an image blur. The image sensor 102 is configured to be driven in a direction perpendicular to the optical axis, to thereby correct an image blur.

The development processing unit 103 includes an analog-to-digital (A/D) conversion circuit, an automatic gain control (AGC) circuit, and an automatic white balance (AWB) circuit, which are not illustrated, and forms a digital signal. The image sensor 102 and the development processing unit 103 constitute an image capturing system for obtaining an image. One or more frame images of the image signal formed by the development processing unit 103 are directly displayed or used for processing and are temporarily stored and held in a memory 104.

An object detection unit 105 performs object detection processing on the image signal output from the development processing unit 103, and detects an object to be tracked (hereinafter also referred to as a "main object"). The main object is a moving object. Examples of the main object include a person (face), an animal, and a vehicle such as a train or an aircraft. A known technique may be used as a method for detecting the main object. Examples of the main object detection method include matching processing to be executed using an object to be detected as a template, and processing of holding a feature amount of an object as data and searching for a region with the same feature amount. As another example, a method of configuring a discriminator for recognizing an object using a learning algorithm as typified by a neural network can be used.

An object motion information obtaining unit 106 obtains object motion information indicating how the main object detected by the object detection unit 105 moves on the image with time. The object motion information can be obtained by obtaining positional information about the main object included in the result of main object detection by the object detection unit 105 in chronological order.

A determination unit 107 estimates the type of blur (motion) generated in the main object of the image and estimates whether it is possible to perform object image stabilization (tracking) in a later time, based on the object motion information obtained by the object motion information obtaining unit 106. Based on the estimation result, the determination unit 107 determines which one of the correction of an object motion (object blur) and the correction of a motion (camera shake) applied to the image capturing apparatus 100 has a higher priority, that is, determines a ratio of object image stabilization to image capturing apparatus image stabilization. If the correction of an object blur has a higher priority than the correction of a camera shake, the ratio of object image stabilization is set to be greater than the ratio of image capturing apparatus image stabilization. If the correction of a shake applied to the image capturing apparatus 100 has a higher priority than the correction of an object blur, the ratio of object image stabilization is set to be smaller than the ratio of image capturing apparatus image stabilization. The ratio of object image stabilization to image capturing apparatus image stabilization refers to an amount of correction due to an amount of each type of blur in the total amount of correction obtained by adding a correction amount for object image stabilization and a correction amount for image capturing apparatus image stabilization. The ratio of object image stabilization refers to an amount of correction due to an amount of object blur in the total correction amount. Also, when it is determined that the correction of an object blur (or a shake applied to the image capturing apparatus) has a higher priority, the shake applied to the image capturing apparatus 100 (or object blur) may also be corrected.

An image capturing apparatus motion information obtaining unit 108 obtains image capturing apparatus motion information indicating motion information about a camera-work motion, a camera shake, or the like generated in the image capturing apparatus 100. The motion of the image capturing apparatus 100 according to the present exemplary embodiment refers to a temporal variation in the position and orientation of the image capturing apparatus 100, and includes not only a user's unintended motion such as a shake, but also a user's intended motion such as panning or tilting. The image capturing apparatus motion information may be obtained by any method. For example, a detection result may be obtained from a gyroscope sensor or an acceleration sensor located in the image capturing apparatus 100. Alternatively, the image capturing apparatus motion information may be obtained by calculating an amount of motion (background vector) of an entire screen between frame images that are temporally continuously obtained by image analysis using the image signal output from the development processing unit 103. The image capturing apparatus motion information may be obtained by any other method.

The correction amount calculation unit 109 calculates the correction amount based on the determination result from the determination unit 107, the image capturing apparatus motion information obtained from the image capturing apparatus motion information obtaining unit 108, and the object motion information obtained from the object motion information obtaining unit 106. In the present exemplary embodiment, this correction amount includes a driving amount of the correction lens, a driving amount of the image sensor 102, and an amount of geometric deformation to be performed by a geometric deformation unit 110. Each image stabilization unit performs image stabilization based on this correction amount. Accordingly, the correction amount calculation unit 109 transmits the calculated correction amount to each image stabilization unit, thus the correction amount calculation unit 109 functions as an image stabilization control unit.

In the present exemplary embodiment, the correction lens included in the optical system 101 and the image sensor 102 are driven, and the geometric deformation unit 110 performs geometric deformation processing. Thus, the image capturing apparatus 100 includes three image stabilization mechanisms. However, it is sufficient if the image capturing apparatus 100 includes at least one image stabilization mechanism, and the image stabilization mechanism does not need to be included in the main body of the image capturing apparatus 100. For example, the image signal obtained by the image capturing apparatus 100 may be received via wired or wireless communication, and an image processing apparatus configured to perform geometric deformation processing on the received image signal may perform image stabilization.

The geometric deformation unit 110 performs geometric deformation processing for correcting a blur using the amount of geometric deformation calculated by the correction amount calculation unit 109. The image obtained after correcting the blur is displayed on a display device by a video image output unit 111, and is stored and held in an image storage device (not illustrated).

An object image stabilization operation to be performed by the image capturing apparatus 100 having the configuration as described above will be described with reference to a flowchart illustrated in FIG. 2. In the present exemplary embodiment, steps S201 to S207 to be described below are executed on each frame, thereby performing object image stabilization in real time.

In step S201, the image sensor 102 outputs an object image formed by the optical system 101 as an analog signal corresponding to an object luminance, and the development processing unit 103 performs processing on the object image to generate an image signal. The development processing unit 103 converts the analog signal into, for example, a 14-bit digital signal using an A/D conversion unit (not illustrated). The digital image signal on which signal level correction processing and white level correction processing are performed by the AGC and AWB circuits (not illustrated) is transmitted to each of the correction amount calculation unit 109 and the video image output unit 111 and is stored and held in the memory 104. In the image capturing apparatus 100 according to the present exemplary embodiment, frame images are sequentially generated at a predetermined frame rate, and the frame images to be transmitted and stored and held are sequentially updated.

In step S202, the image capturing apparatus motion information obtaining unit 108 obtains image capturing apparatus motion information. The motion information obtained in step S202 is transmitted to the correction amount calculation unit 109.

In step S203, the object detection unit 105 detects a main object present in the frame images obtained in step S201. Even in a case where a plurality of objects that can be detected as the main object is present in the image, one object is selected in the present exemplary embodiment. As an example of the object selection method, the object detection unit 105 may select one object that can be considered to be a principal object and may output the object. For example, an object may be selected based on an estimation that, for example, an object having a size that is larger than any other objects, an object that is located closer to the center of the image, or an object with a higher degree of detection reliability has a higher degree of importance. Another example of the object selection method is a method of causing the user to select a principal object from among a plurality of object candidates.

In step S203, the position of the main object, the size of the main object, and the degree of reliability of the main object (information indicating the likelihood of a person of the object, if the main object is a person) are obtained. The positional information about the object detected in step S203 is transmitted to the object motion information obtaining unit 106.

In step S204, the object motion information obtaining unit 106 obtains object motion information indicating an amount of movement of the main object based on the positional information about the main object detected and selected in step S203. If the object is first detected in the processing of step S203 in the current frame, step S204 for the current frame is skipped and step S204 for the subsequent frame is performed to obtain object motion information.

The method for obtaining the amount of movement of the main object is not particularly limited. For example, the position of the main object may be obtained by known template matching using a partial image including the object detected as the main object in step S203 as a template. The positions of the main object in the previous frames of the image are arranged in chronological order, thereby obtaining a relationship between time and the amount of movement of the main object. If the main object is lost, the processing may be performed again from the object detection processing (step S203) by the object detection unit 105.

For example, pieces of positional information about the main object output from the object detection unit 105 are arranged in chronological order, thereby making it possible to obtain object motion information indicating the relationship between time and the amount of movement of the main object.

In step S205, the determination unit 107 determines whether object image stabilization has a higher priority than camera shake correction in the current frame based on the motion of the main object on the image obtained by the object motion information obtaining unit 106. This determination may be hereinafter referred to as object motion determination.

Then, a state where it is determined that object image stabilization has a higher priority in the previous frame is switched to a state where object image stabilization is not performed with a higher priority in the current frame, or a state where object image stabilization has a higher priority is switched to a state where camera shake correction has a higher priority. This switching method will be described in the following steps. Consequently, an excellent image can be generated while the entire image can be stabilized, although an object blur cannot be corrected any more.

A method for determining whether object image stabilization has a higher priority over a camera shake correction will now be described. In the present exemplary embodiment, it is predicted whether it is highly likely that an object blur becomes unable to be corrected in a later time based on the object motion information obtained up to the current time by the object motion information obtaining unit 106. Then, if it is predicted that it is highly likely that an object blur becomes unable to be corrected in a later time, it is determined that object image stabilization is not performed with a higher priority. If it is predicted that it is not highly likely that an object blur cannot be corrected in a later time, it is determined that object image stabilization is performed with a higher priority. The case in which it is highly likely that an object blur cannot be corrected refers to a case in which, for example, an object blur is large, and it is highly likely that the amount of image stabilization may be too large to correct the object blur by each image stabilization unit.

Beneficial effects of switching from camera shake correction to object image stabilization and an object motion determination method will be described in detail with reference to FIGS. 3A and 3B and FIGS. 4A to 4C.

Figure 3A:
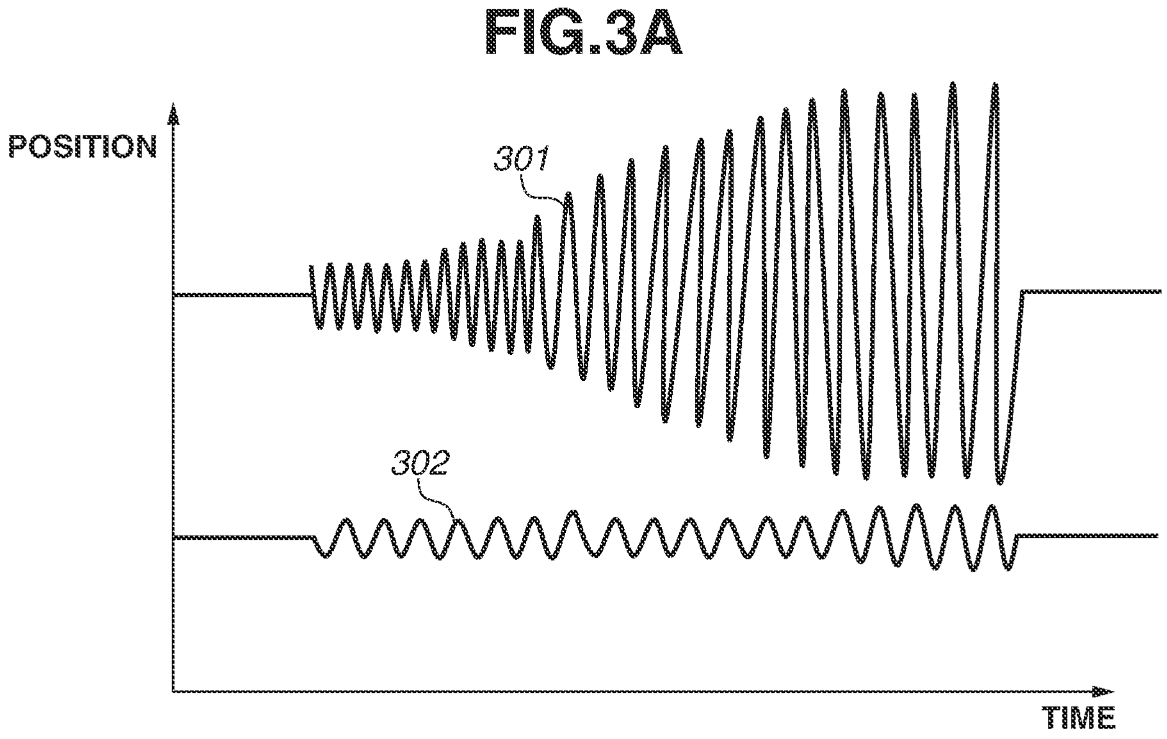
FIGS. 3A and 3B are graphs schematically illustrating switching of a correction target between a camera shake and an object blur.
Figure 3B:
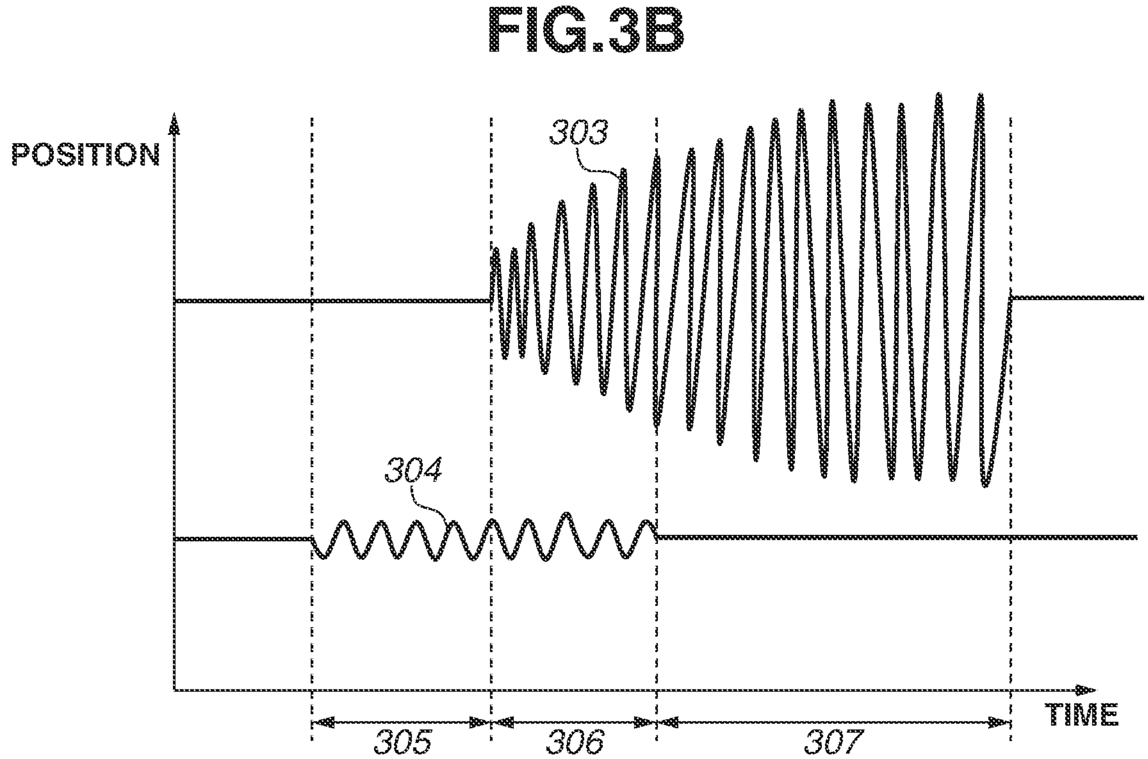

FIGS. 3A and 3B are graphs each illustrating a temporal change of a camera shake and an object blur. In FIGS. 3A and 3B, a horizontal axis represents time and a vertical axis represents a position on the image. In the present exemplary embodiment, for convenience of illustration, a motion in one direction is illustrated as a blur on each graph. However, an actual motion on an image is a two-dimensional motion, and the same holds true for motions in other directions.

FIG. 3A is a graph schematically illustrating an object blur and a camera shake appearing on the image in a case where an object blur and a camera shake occur. A position 301 of the main object to be subjected to object image stabilization changes with time, which indicates an amplitude motion of the main object. On the other hand, a motion caused by a camera shake appearing on the image is a motion that is applied to the image capturing apparatus 100 and appears on the image. Accordingly, the camera shake motion is a motion occurring on the entire image, unlike a motion in a local region such as the main object. Accordingly, a background position 302 illustrated in FIG. 3A, which is located at the center of the image, indicates a motion of the image capturing apparatus 100, that is, a camera shake.

As described above, FIG. 3B is a graph schematically illustrating an object blur and a camera shake appearing on the image when the processing of switching the control operation from object image stabilization to camera shake correction is performed.

During a period of time indicated by a period 305, an object blur is corrected and object image stabilization for fixing the position of the object at a target position is performed. Accordingly, a position 303 of the main object on the image does not change during the period 305, and the main object image is continuously set at the target position. On the other hand, a camera shake is not corrected, so that a background position 304 located at the center of the image varies.

During a period 306, if an object blur is large and the object blur cannot be corrected, each image stabilization unit is controlled to correct a camera shake from a period 307 after the period 306. This configuration makes it possible to reduce the motion in the entire screen indicating the motion of the camera shake, while the position of the main object moves, after the period 307. On the other hand, if this switching processing is not performed, the period in which an object blur and a camera shake cannot be reduced and remain on the image, like the period 306, continues. Thus, the control operation is switched from object image stabilization to camera shake correction based on the motion information about the object on the image, thereby making it possible to reduce the period in which an object blur and a camera shake cannot be reduced and remain on the image, like the period 306.

A situation where object image stabilization cannot be performed occurs, for example, if the object motion information obtaining unit 106 cannot obtain a motion amount of the main object when the main object moves extremely rapidly, or changes its direction frequently, or if the image stabilization processing is beyond the driving ability of the image stabilization unit.

As illustrated in FIG. 3B, if it is determined whether object image stabilization is to be continued based on the motion information transmitted from the object motion information obtaining unit 106 after an object blur cannot be corrected any more, it takes a certain period of time to determine that object image stabilization is not to be continued after object image stabilization cannot be performed any more. Accordingly, the period in which the motion of the object and the motion of the camera shake are not stopped, like the period 306, occurs. Therefore, it may be desirable to predict whether object image stabilization can be continued in a later time from the state where object image stabilization can be performed (during the period 305), instead of determining whether object image stabilization can be continued for the first time after an object blur actually become unable to be corrected. Consequently, the period in which an object blur and a camera shake cannot be reduced and remain on the image, like the period 306, can be reduce (or eliminated).

Figures 4A, 4B, 4C:
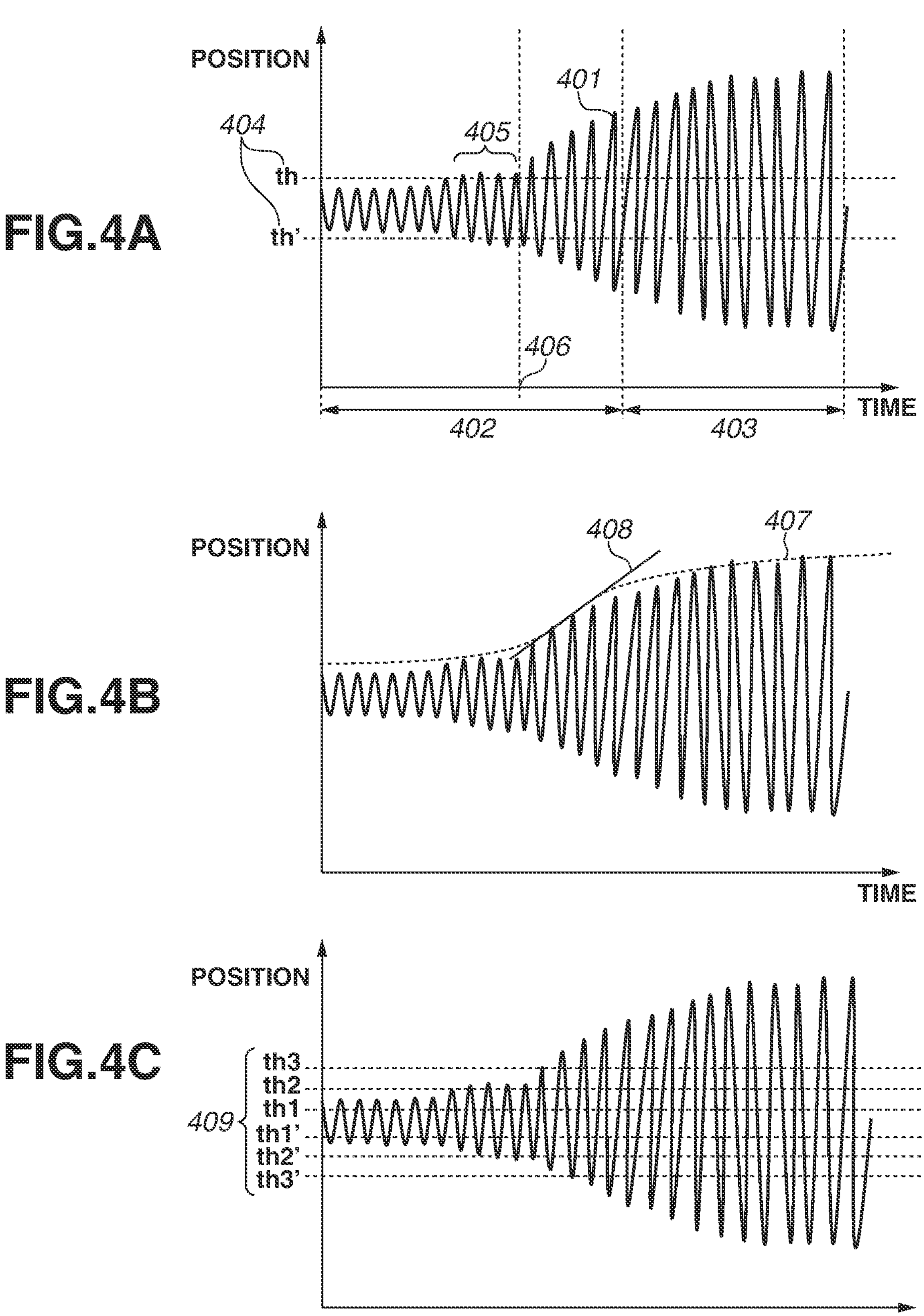
FIGS. 4A to 4C are graphs schematically illustrating object motion determination.

FIGS. 4A to 4C each schematically illustrate an example of an object blur determination method. Like in FIGS. 3A and 3B, the horizontal axis represents time and the vertical axis represents a position on the image in FIGS. 4A to 4C.

FIG. 4A schematically illustrates an example of the method for determining whether it is likely that an object blur becomes unable to be corrected based on the size of the object blur. A position 401 of the main object to be subjected to object image stabilization indicates an example where the motion of the main object during a period 402 is small enough to be corrected by object image stabilization and the amplitude of the amount of movement of the object during a period 403 and a subsequent period is too large to be corrected by object image stabilization. In the example illustrated in FIG. 3B, it is determined that object image stabilization cannot be continued after object image stabilization cannot be performed any more. For this reason, the period 306 in which an object blur and a camera shake cannot be corrected and remain on the image occurs. However, in the example illustrated in FIG. 4A, object motion information is obtained during the period 402, and it is predicted whether it is likely that object image stabilization cannot be continued during a period after the period 402. In other words, the processing of predicting whether object image stabilization can be continued in a later time in parallel with object image stabilization processing is performed.

An example of the prediction method is a method of setting a threshold 404 (indicated by th and th' in this case) to be used for determination. In this method, if the motion of the object exceeds the threshold 404 by a predetermined number of times, it is determined that it is highly likely that the motion of the object may increase thereafter, which may lead to a high possibility that object image stabilization becomes unable to be performed. In the example illustrated in FIG. 4A, the motion of the object during a period 405 in the period 402 in which object image stabilization can be performed exceeds the threshold 404 by the predetermined number of times, and thus, at time 406, it is determined that it is highly likely that object image stabilization becomes unable to be performed in a later time. In this case, the threshold 404 may be a fixed value or a variable value. If the threshold 404 is a variable value, for example, the threshold 404 may be set based on a main object search range (range in which the main object detected in step S203 is searched for) in the object detection unit 105, or a movable range of each of the optical system 101 and the image sensor 102, or may be set based on an object type and an object distance obtained separately.

Because the direction in which the object moves is unknown, it may be desirable to set the same value to the thresholds for both the directions of the motion, like the threshold 404, based on, for example, an object image stabilization control start position or a target position where the object is fixed as a reference. Also, the method for setting the predetermined number of times is not particularly limited. A predetermined fixed value may be used, or the predetermined number of times may be set depending on the motion of the object. Examples of the method for setting the predetermined number of times depending on the motion of the object include a method of increasing the number of times if the object is moving intensively and decreasing the number of times if the motion of the object is small, depending on the object type obtained separately and the result of action determination.

To predict whether it is likely that object image stabilization cannot be continued, not only the number of times by which the threshold is exceeded but also a period of time over which the threshold is exceeded can be used. If the motion of the object continuously exceeds the thresholds over a predetermined period of time, it can be determined that it is highly likely that the motion of the object may increase thereafter, which may lead to a high possibility that object image stabilization becomes unable to be performed.

Further, if the object motion includes an amplitude motion, an envelope curve representing the object motion (envelope curve representing a temporal change of the object position 401) may be used for determination. FIG. 4B illustrates an envelope curve 407 depicting the object motion. The slope of the envelope curve 407 is calculated and the calculated slope is sequentially observed from a point of time (period 305 in FIG. 3B) when object image stabilization can be performed, thereby determining whether it is highly likely that object image stabilization becomes unable to be performed in a later time.

FIG. 4B illustrates a tangent line 408 on the envelope curve at a certain time. If the slope of the tangent line 408 is greater than a predetermined threshold, it is determined that it is highly likely that the object motion may increase in a later time, which may lead to a high possibility that object image stabilization becomes unable to be performed. Further, if the slope of the tangent line 408, that is, the increasing tendency of the object motion can be obtained, it is possible to calculate how large the object motion becomes and when the object motion increases to the magnitude based on the magnitude of the slope. Accordingly, a timing when object image stabilization becomes unable to be performed can also be predicted.

While FIG. 4A illustrates an example where one threshold is set for object motion determination, a plurality of thresholds with different values may be set to enhance the determination accuracy. FIG. 4C is a graph schematically illustrating a case where object motion determination is performed with a plurality of thresholds set. In FIG. 4C, it is assumed that a plurality of thresholds 409 (three thresholds th1, th2, and th3 illustrated in FIG. 4C) for object motion determination. As a method for determining the object motion when a plurality of thresholds is set, for example, a period of time from when a first threshold (th1 or th1'), which is a smallest threshold, is first exceeded to when a second threshold (th2 or th2'), which is a second largest threshold, is exceeded, and a period of time from when the second threshold is exceeded to when a third threshold (th3 or th3'), which is a largest threshold, is exceeded may also be used. Instead of using the periods of time as described above, the number of times by which the first threshold is exceeded during a period from when the first threshold is first exceeded to when the second threshold is exceeded, and the number of times by which the second threshold is exceeded during a period from when the second threshold is exceeded to when the third threshold is exceeded. Specifically, a period of time until when the object motion becomes unable to be corrected can be predicted based on a difference between the length of the period of time from when the first threshold is exceeded to when the second threshold is reached and the length of the period of time from when the second threshold is exceeded to when the third threshold is reached. Similarly, the number of amplitude motions until the object motion becomes unable to be corrected can be predicted based on a difference between the number of times by which the first threshold is exceeded during the period from when the first threshold is exceeded to when the second threshold is reached and the number of times by which the second threshold is exceeded during the period from when the second threshold is exceeded to when the third threshold is reached.

The use of the plurality of thresholds as described above makes it possible to predict and determine the timing when an object motion or an object blur becomes unable to be corrected in a later time more accurately than in the case of using one threshold. As illustrated in FIG. 4C, if the amount of movement of the object gradually exceeds the thresholds from a smaller threshold to a larger threshold, it is determined that it is highly likely that the object motion becomes unable to be corrected in a later time. While FIG. 4C illustrates an example where three thresholds are set, the number of thresholds to be set is not particularly limited. More than three thresholds may be set to make a more detailed determination. The use of this determination method makes it possible to change the ratio of object image stabilization to camera shake correction based on a determination of which one of the thresholds the motion of the object exceeds. For example, when the smallest threshold is exceeded, the ratio of object image stabilization is set to be smaller than that before the smallest threshold is exceeded, and the ratio of camera shake correction is increased. When the second largest threshold is exceeded, the ratio of object image stabilization is set to be much lower than that after the smallest threshold is exceeded, and the ratio of camera shake correction is increased. Further, when the largest threshold is exceeded, the ratio of object image stabilization is set to be much lower than that after the second largest threshold is exceeded, and the ratio of camera shake correction is increased.

The determination as to whether the object motion can be corrected may be associated with the motion of the image capturing apparatus 100 in some cases. If the user has moved the image capturing apparatus 100 to a large extent due to a camerawork such as panning, or if a camera shake caused due to a change in an image capturing status or the like is considerably large, the apparent motion of the object on the image is relatively increased. If such a phenomenon occurs, the object motion cannot be corrected even when the motion of the object itself is small. For this reason, the processing of switching the control operation from object motion correction to camera shake correction makes it possible to prevent deterioration in the quality of the captured image. The method for determining the motion of the image capturing apparatus can be implemented by, for example, applying the above-described object motion determination method to the motion of the image capturing apparatus 100. As the image capturing apparatus motion information, the information obtained by the image capturing apparatus motion information obtaining unit 108 may be used.

The determination as to whether the object motion becomes unable to be corrected based on the motion of the image capturing apparatus 100 need not be based only on the object motion information obtained by the object motion information obtaining unit 106. For example, the determination may be made in consideration of the motion of the image capturing apparatus 100 in addition to the object motion information obtained by the object motion information obtaining unit 106. The position of the main object on the image may be varied due to the motion of the main object itself and due to the motion of the image capturing apparatus 100. The motion of the main object itself may be extracted based on the object motion information obtained by the object motion information obtaining unit 106 and the motion of the image capturing apparatus 100, and the determination processing described above with reference to FIGS. 4A to 4C may be performed. Alternatively, image capturing apparatus motion information indicating frequencies (mainly higher frequencies) that are not included in the object motion information may be obtained from the gyroscope sensor or the acceleration sensor, and the image capturing apparatus motion information may be converted into a motion on the image. The motion amount may be added to the motion of the object to thereby perform the object motion determination processing described above with reference to FIGS. 4A to 4C. This processing makes it possible to determine whether the object motion can be tracked in a state where the motion of the image capturing apparatus 100 is considered.

In the determination as to whether an object blur can be corrected, the amount of correction to be performed by each image stabilization unit may also be considered. The correction lens, the image sensor 102, or the geometric deformation unit 110 is driven to correct an object blur, so that an image capturing range is changed compared to a case where the correction lens, the image sensor 102, or the geometric deformation unit 110 is not driven. An amount of change in the image capturing range is obtained based on the correction amount, and the amount of change is added to the motion of the object. Thus, the amount of movement of the object in the image when object image stabilization is not performed can be obtained. The determination as to whether an object blur can be corrected, or the prediction as to whether an object blur can be corrected in a later time may be performed based on the amount of movement of the object.

While, in the present exemplary embodiment described above, the description has been given of an example where it is determined whether object image stabilization is to be continued based on the object motion by an analytical method, machine learning can also be used to determine whether object image stabilization is to be continued. A neural network model may be created in advance using an object motion and information indicating a determination as to whether object image stabilization can be continued as training data, and the neural network model is applied to object motion information obtained during image capturing, thereby making it possible to predict whether object image stabilization can be performed in a later time.

In the present exemplary embodiment described above, the description has been given of a method for predicting whether the object motion can be corrected in a later time and determining whether object image stabilization is to be continued. An object motion determination result obtained by using one or more of the above-described methods is transmitted to the correction amount calculation unit 109.

The processing of switching the control operation from object image stabilization to camera shake correction is described above. However, if the object motion has decreased after the control operation is switched from object image stabilization to camera shake correction once during the object image stabilization operation, the control operation may be switched to object image stabilization again. The determination as to whether to switch the control operation to object image stabilization again can be made in the same manner as in the determination method described above. Specifically, it is predicted whether object image stabilization can be performed in a later time based on the amount of movement of the object. If it is predicted that object image stabilization can be performed in a later time, it is determined that object image stabilization has a higher priority. If it is predicted that object image stabilization cannot be performed, it is determined that camera shake correction has a higher priority (camera shake correction is continuously performed). Steps S201 to S207 are executed on a plurality of frames continuously obtained, and this cycle is repeatedly carried out after the control operation is switched to camera shake correction, thereby making it possible to return to object image stabilization again. In this case, however, after the control operation is switched to camera shake correction once, the control operation may be configured to be not returned to object image stabilization, unless an operation, such as a restart instruction, is received from the user. As the threshold, the predetermined number of times, the predetermined period of time, and the like to be used for determination as to whether to return to object image stabilization again, values different from the threshold, the predetermined number of times, and the predetermined period of time, which are used to determine whether to switch the control operation from object image stabilization to camera shake correction, may be set. To prevent switching between object image stabilization and camera shake correction from frequently occurring, it may be desirable to set conditions such that the processing of switching from camera shake correction to object image stabilization is less likely to be performed than the processing of switching from object image stabilization to camera shake correction. For example, the threshold for determining whether to return to object image stabilization again may be set to be smaller than the threshold to be used for determination as to whether to switch the control operation from object image stabilization to camera shake correction. Similarly, the predetermined number of times may be set to be more than the predetermined number of times to be used for determination as to whether to switch the control operation from object image stabilization to camera shake correction, and it may be determined to return to object image stabilization if a state where the amplitude is less than or equal to a threshold exceeds the predetermined number of times. Further, the predetermined period of time may be set to be longer than the predetermined period of time to be used for determination as to whether to switch the control operation from object image stabilization to camera shake correction, and it may be determined to return to object image stabilization if a state where the amplitude is less than or equal to the threshold is continued over the predetermined period of time or longer. In the case of determining whether to return to object image stabilization based on the slope of the tangent line 408 on the envelope curve 407, it may be determined to return to object image stabilization if the direction of the slope is opposite to that of the slope illustrated in FIG. 4B (that is, a direction in which an object blur gradually decreases) and the slope is greater than a threshold.

In step S206, the correction amount calculation unit 109 calculates an image blur correction amount based on the object motion determination result, the object motion information, and the image capturing apparatus motion information.

Based on the object motion determination result transmitted from the determination unit 107, the correction amount calculation unit 109 calculates a third correction amount by adding a first correction amount that is based on the amount of movement of the object indicated by the object motion information and a second correction amount that is based on the amount of movement of the image capturing apparatus 100 indicated by the image capturing apparatus motion information. Specifically, if the object motion determination result output from the determination unit 107 indicates that object image stabilization is to be continued, the correction amount calculation unit 109 adds a more weight to the first correction amount than the second correction amount, thereby setting the ratio of object image stabilization to be greater than the ratio of camera shake correction. Thus, an object blur can be corrected with a higher priority than the correction of a camera shake. On the other hand, if the object motion determination result output from the determination unit 107 indicates that object image stabilization is not to be continued, the correction amount calculation unit 109 adds a more weight to the second correction amount than the first correction amount, thereby setting the ratio of camera shake correction to be greater than the ratio of object image stabilization. Thus, a camera shake can be corrected with a higher priority than the correction of an object blur.

As described above, the correction of an object blur (or camera shake) with a higher priority means not correcting a camera shake (or object blur), and the weight of the correction amount to which a more weight is not added during weight addition may be "0". Thus, a control operation for switching a blur to be corrected with a higher priority between an object blur and a shake of the image capturing apparatus 100, that is, a control operation for switching the control operation by each image stabilization unit between control for object image stabilization and control for camera shake correction can be performed. In the present exemplary embodiment, each image stabilization unit indicates one or more of a mechanism for displacing a blur correction lens of the optical system 101, a mechanism for displacing the image sensor 102, and the geometric deformation unit 110. In the case of performing image stabilization using a plurality of image stabilization units, the third correction amount is divided into control values for the image stabilization units, and the control values are transmitted as control values to the respective image stabilization units.

The first correction amount can also be obtained based on positional information about the object obtained from the object detection unit 105, instead of using the object motion information obtained from the object motion information obtaining unit 106. The first correction amount may be obtained based on a difference between the position of the main object obtained from the object detection unit 105 and a target position (e.g., the center of the image) of the main object set in the image, and object image stabilization can be performed by making the position of the main object in the image closer to the target position.

If the control operation for each image stabilization unit is switched instantaneously, the motion of the object appearing on a screen may be suddenly switched from a state where the motion of the object is stopped to a state where the camera shake is stopped, or vice versa, so that a discontinuous motion occurs on the screen, and the video image gives a feeling of strangeness to the user, is generated. As a method for preventing such a phenomenon from occurring, the control operation can be gradually switched to control for camera shake correction until object image stabilization actually becomes unable to be performed after it is determined that it is highly likely that object image stabilization becomes unable to be performed in a later time. Specifically, in the example illustrated in FIG. 4A, the control operation is gradually switched to control for camera shake correction during a period from the time 406 to the end of the period 402. Consequently, the feeling of strangeness associated with switching from object image stabilization to camera shake correction can be reduced.

To gradually switch the control operation from object tracking to camera shake correction, the method of simply changing the ratio of object image stabilization to camera shake correction at a predetermined ratio is a simplest method.

Figure 5:
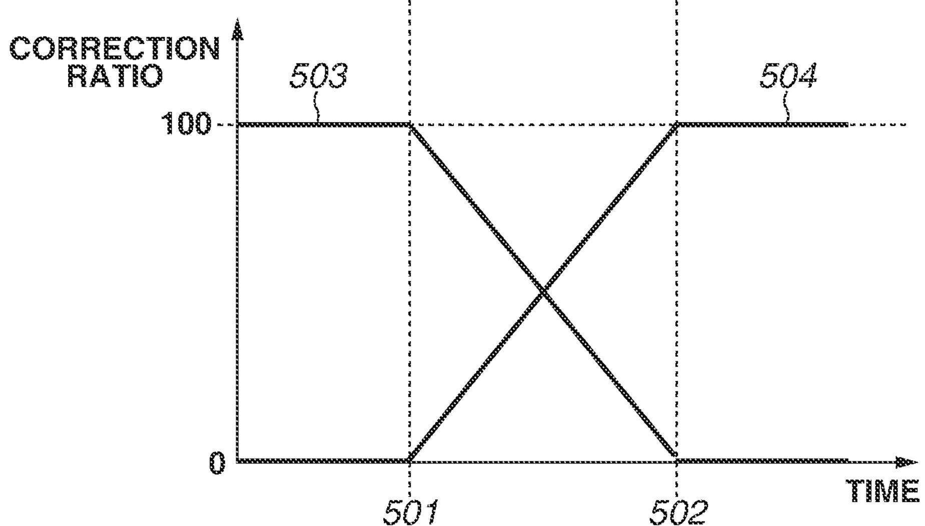
FIG. 5 is a graph schematically illustrating a correction target switching method.

However, according to this switching method, there is a possibility that an object blur becomes unable to be corrected before the control operation is completely switched to camera shake correction, or a possibility that the control operation may be switched to camera shake correction in a state where an object blur can be sufficiently corrected. Accordingly, to naturally switch the control operation, it may be desirable to use information about a time when that object tracking is predicted to become unable to be continued, which can be obtained from the determination unit 107. FIG. 5 schematically illustrates an example of the switching method.

In FIG. 5, the horizontal axis represents time and the vertical axis represents a ratio of control for object blur correction to control for camera shake correction. Time 501 indicates a time (time 401 in FIG. 4A) when the prediction result obtained from the determination unit 107 indicates that an object blur becomes unable to be corrected, and time 502 indicates a time (predicted end time of the period 402 in FIG. 4A) when the prediction result indicates that object tracking becomes unable to be continued. FIG. 5 also illustrates a temporal variation of a control ratio 503 for correcting an object blur and a control ratio 504 for correcting a camera shake. As illustrated in FIG. 5, an object blur can be corrected until the time 501, which indicates a state where only the control operation for object image stabilization is performed. However, after it is predicted that object tracking becomes unable to be performed in a later time at the time 501, the ratio of control for camera shake correction is gradually increased so that only the control for camera shake correction is performed until the time 502 when object tracking is predicted to become unable to be performed. In this case, it may be desirable to determine a speed (slope) for changing the ratio based on the length of a period of time from the time 501 to the time 502. This makes it possible to reduce the possibility that an object blur becomes unable to be corrected before the control operation is completely switched to control for camera shake correction, or the possibility that the control operation may be switched to camera shake correction in a state where an object blur can be sufficiently corrected. As a method for predicting the time when object tracking becomes unable to be continued, for example, the tendency of an object motion in a later time can be predicted based on the number of times by which the object motion exceeds a threshold and a period of time over which the object motion exceeds the threshold, if the determination methods illustrated in FIGS. 4A and 4C are used. Also, in the method illustrated in FIG. 4B, a period of time until the object motion reaches an upper limit where the motion can be corrected can be predicted based on the slope of an envelope curve. While FIG. 5 illustrates a method for linearly changing the ratio of control for object blur correction to control for camera shake correction, the present exemplary embodiment is not limited to this method. For example, by using a method for gently changing the ratio of control for object blur correction to control for camera shake correction such that the lines of the control ratios 503 and 504 in the graph of FIG. 5 gently curve, the control operation can be performed so that one of object blur correction and camera shake correction is performed with a higher priority. For example, if a variation in the motion of the object is large, an error may occur at the time when an object blur is predicted to become unable to be corrected, or an object blur cannot be corrected suddenly.

In such cases, it may be desirable to complete the switching processing earlier than the time when object image stabilization is predicted to become unable to be performed, instead of performing control processing to completely switch the control operation to control for camera shake correction at the time when object image stabilization is predicted to become unable to be performed, thereby making it possible to reduce the possibility that the image may be inadvertently disturbed.

In step S207, an image stabilization member is driven or image processing is performed to perform one or both of object image stabilization and camera shake correction based on the control values for the respective image stabilization units calculated by the correction amount calculation unit 109. The thus obtained frame images in which the blur is corrected are transmitted to the video image output unit 111. The video image output unit 111 displays the frame images which are obtained from the geometric deformation unit 110 and in which the blur is corrected on a monitor or the like (not illustrated) and stores and holds the frame images in the image storage device.

As described above, in the present exemplary embodiment, it is determined whether object motion tracking can be performed, and if it is determined that object tracking becomes unable to be performed, the control operation for driving each image stabilization unit is switched from object tracking to camera shake correction. This processing makes it possible to prevent a situation where an object motion and an image blur cannot be corrected from occurring, or to reduce the period of time in which this situation occurs. Further, it is predicted whether object image stabilization becomes unable to be performed in a later time in a state where object image stabilization can be performed, thereby making it possible to eliminate a time lag caused during the switching processing, or to reduce the time lag even if the time lag occurs. Consequently, it is possible to prevent the situation where object tracking and camera shake correction both cannot be performed, or to reduce the period of time in which this situation occurs.

While, in the exemplary embodiments described above, the description has been given of an example where the object motion is a one-dimensional motion, an object blur or a camera shake two-dimensionally occurs on an actual image. To cope with the two-dimensional blur, for example, the above-described determination method and switching method may be applied to each direction of motion to be determined, such as a vertical direction and a horizontal direction. In this case, if there is no need to switch the control operation at the same ratio in the vertical direction and in the horizontal direction. For example, if it is determined that object image stabilization becomes unable to be performed on the motion of the object in the vertical direction, only the control operation in the vertical direction may be switched to camera shake correction. As for the motion in the horizontal direction, object image stabilization is continued during a period in which an object blur can be corrected, so that object tracking can be continued as long as possible. After that, the control operation on the motion in the horizontal direction may be switched to camera shake correction after it is determined that an object blur becomes unable to be continued on the motion in the horizontal direction.

While, in the exemplary embodiments described above, the description has been given of an example where the image capturing apparatus 100 is used as the image stabilization apparatus, the image stabilization apparatus may be separate from the image capturing apparatus 100, as long as an image can be received from the image capturing apparatus 100. For example, an image processing apparatus configured to perform the electronic image stabilization processing described above may receive an image from the image capturing apparatus 100, and may perform object detection processing, object motion determination processing, and the like described above on the received image, to thereby perform electronic image stabilization processing based on the determination result.

While, in the exemplary embodiments described above, the description has been given of an example of capturing a moving image, the image to be used is not limited to a moving image, as long as a plurality of successive images can be obtained. For example, the present exemplary embodiment can be applied to a configuration in which still images are continuously captured.

Exemplary embodiments of the disclosure have been described above. The disclosure is not limited to the above-described exemplary embodiments, and various modifications and changes can be made within the gist of the disclosure.

According to an aspect of the disclosure, it is possible to provide an image stabilization apparatus configured to obtain an excellent video image by switching a blur to be corrected with a higher priority.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-040821, filed Mar. 15, 2023, which is hereby incorporated by reference herein in its entirety.

What is claimed is:

1. An apparatus comprising:

one or more processors; and at least one memory coupled to the one or more processors storing instructions that, when executed by the one or more processors, cause the one or more processors to function as:

a detection unit configured to detect an object from an image;

a first obtaining unit configured to obtain motion information indicating a motion of the detected object;

a second obtaining unit configured to obtain motion information indicating a motion of a capturing apparatus;

a control unit configured to control first stabilization to correct the motion of the object in the image and second stabilization to correct an image blur caused by the motion of the capturing apparatus; and a determination unit configured to perform a determination of which one of the first stabilization and the second stabilization has a higher priority based on the motion information about the object, wherein the control unit controls the first stabilization and the second stabilization based on a result of the determination, and wherein in a case where the determination unit determines that the second stabilization has a higher priority than the first stabilization during execution of the first stabilization with a higher priority than the second stabilization, the control unit switches from the first stabilization to the second stabilization at a predetermined weighting ratio.

2. The apparatus according to claim 1, wherein the determination unit performs the determination based on the motion information about the object during execution of the first stabilization.

3. The apparatus according to claim 1, wherein, in the first stabilization, a position of the object in the image is made closer to a position closer to a target position set in the image.

4. The apparatus according to claim 1, wherein the control unit calculates a correction amount for correction to be performed by a stabilization unit based on a result of the determination, the motion of the object, and the motion of the capturing apparatus.

5. The apparatus according to claim 4, wherein the control unit changes weighting for a first correction amount and weighting for a second correction amount based on the result of the determination, the first correction amount being based on the motion of the object and the second correction amount being based on the motion of the capturing apparatus.

6. The apparatus according to claim 5, wherein the first correction amount is based on a position of the object in the image and a target position set in the image.

7. The apparatus according to claim 5, wherein the first correction amount is based on an amount of movement of the object.

8. The apparatus according to claim 1, wherein in a case where an amount of movement of the object exceeds a threshold by a predetermined number of times, the determination unit determines that the second stabilization has a higher priority than the first stabilization based on the motion information about the object.

9. The apparatus according to claim 1, wherein in a case where an amount of movement of the object exceeds a threshold over a predetermined period of time, the determination unit determines that the second stabilization has a higher priority than the first stabilization based on the motion information about the object.

10. The apparatus according to claim 1, wherein in a case where a slope of an envelope curve representing an amount of movement of the object exceeds a threshold, the determination unit determines that the second stabilization has a higher priority than the first stabilization based on the motion information about the object.

11. The apparatus according to claim 1, wherein a plurality of thresholds with different magnitudes is set for the determination unit, and in a case where an amount of movement of the object exceeds the thresholds in a phased manner, the determination unit determines that the second stabilization has a higher priority than the first stabilization based on the motion information about the object.

12. The apparatus according to claim 1, wherein the determination unit performs the determination based on the motion information about the capturing apparatus, and in a case where a temporal variation in an amount of movement of the capturing apparatus increases, the determination unit determines that the second stabilization has a higher priority than the first stabilization.

13. The apparatus according to claim 1, wherein the determination unit obtains an amount of change in a capturing range by driving of a stabilization unit configured to perform the first stabilization and the second stabilization to correct the image blur, and performs the determination based on a movement amount obtained by adding the amount of change and an amount of movement of the object that is based on the motion information about the object.

14. The apparatus according to claim 1, wherein the determination unit performs the determination using machine learning.

15. The apparatus according to claim 1, wherein in a case where the determination unit determines that the first stabilization becomes unable to be performed during execution of the first stabilization with a higher priority than the second stabilization, the determination unit estimates a time when the first stabilization becomes unable to be performed, and the control unit gradually switches the first stabilization to the second stabilization over a period of time before the estimated time.

16. The apparatus according to claim 1, wherein in a case where the determination unit determines that the second stabilization has a higher priority than the first stabilization, the control unit switches the first stabilization to the second stabilization more rapidly as an amount of movement of the object is larger.

17. The apparatus according to claim 1, wherein in a case where the determination unit determines that the second stabilization has a higher priority than the first stabilization, the control unit switches the first stabilization to the second stabilization at respective different speeds in a horizontal direction and a vertical direction.

18. A capturing apparatus comprising:
the apparatus according to claim 1;
a sensor configured to capture the image; and
a stabilization unit configured to be controlled by the control unit.

19. A method for an apparatus, comprising:
detecting an object from an image;
obtaining first information indicating a motion of the object detected in the image;
obtaining second information indicating a motion of a capturing apparatus;
determining which of first stabilization to correct the motion of the object in the image and second stabilization to correct an image blur caused by the motion of the capturing apparatus
has a higher priority based on the motion information about the object; and
controlling the first stabilization and the second stabilization based on a result of the determination,
wherein in a case where, during execution of the first stabilization having a higher priority than the second stabilization, it is determined that the second stabilization has a higher priority than the first stabilization, control is switched from the first stabilization to the second stabilization at a predetermined weighting ratio.

* * * * *